(12) United States Patent
Turchi et al.

(10) Patent No.: US 7,812,584 B2
(45) Date of Patent: Oct. 12, 2010

(54) METHOD FOR REGULATING A VOLTAGE AND CIRCUIT THEREFOR

(75) Inventors: Joel Turchi, Gagnac sur Garonne (FR); Christophe Basso, Pibrac (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 762 days.

(21) Appl. No.: 11/575,632

(22) PCT Filed: Apr. 18, 2006

(86) PCT No.: PCT/US2006/014299

§ 371 (c)(1),
(2), (4) Date: Mar. 20, 2007

(87) PCT Pub. No.: WO2007/120131

PCT Pub. Date: Oct. 25, 2007

(65) Prior Publication Data

US 2009/0167365 A1 Jul. 2, 2009

(51) Int. Cl.
G05F 1/46 (2006.01)
G05F 1/56 (2006.01)
G05F 1/565 (2006.01)
G05F 1/569 (2006.01)
G05F 1/575 (2006.01)

(52) U.S. Cl. .................................... 323/284; 323/222

(58) Field of Classification Search ......... 323/222–223, 323/265, 282, 284–285, 351
See application file for complete search history.

(56) References Cited

U.S. PATENT DOCUMENTS

| 6,198,330 | B1* | 3/2001 | Hopkins ............... 327/333 |
| 6,965,223 | B1* | 11/2005 | MacLean et al. ........... 323/284 |
| 2004/0245974 | A1* | 12/2004 | Kitani et al. ............ 323/284 |
| 2005/0002211 | A1* | 1/2005 | Lee et al. ............... 363/44 |

* cited by examiner

*Primary Examiner*—Gary L Laxton
*Assistant Examiner*—Nusrat J Quddus
(74) *Attorney, Agent, or Firm*—Rennie William Dover

(57) ABSTRACT

A regulator circuit and a method for regulating an output voltage. The regulator circuit includes an undervoltage protection stage capable of operating in a plurality of operating modes. In one mode, the undervoltage protection stage compensates for a low undervoltage appearing in the output voltage and in another mode it compensates for a large undervoltage appearing in the output voltage. When the output voltage has a low undervoltage, a portion of the current from a current source is routed to a feedback network to balance the input voltages of the undervoltage protection stage and to place the voltage regulator in a steady state operating mode. When the output voltage has a large undervoltage, the undervoltage protection stage turns on a current sourcing transistor that cooperates with the current from the current source to quickly charge a compensation capacitor and increase the power appearing at the output of the voltage regulator.

28 Claims, 1 Drawing Sheet

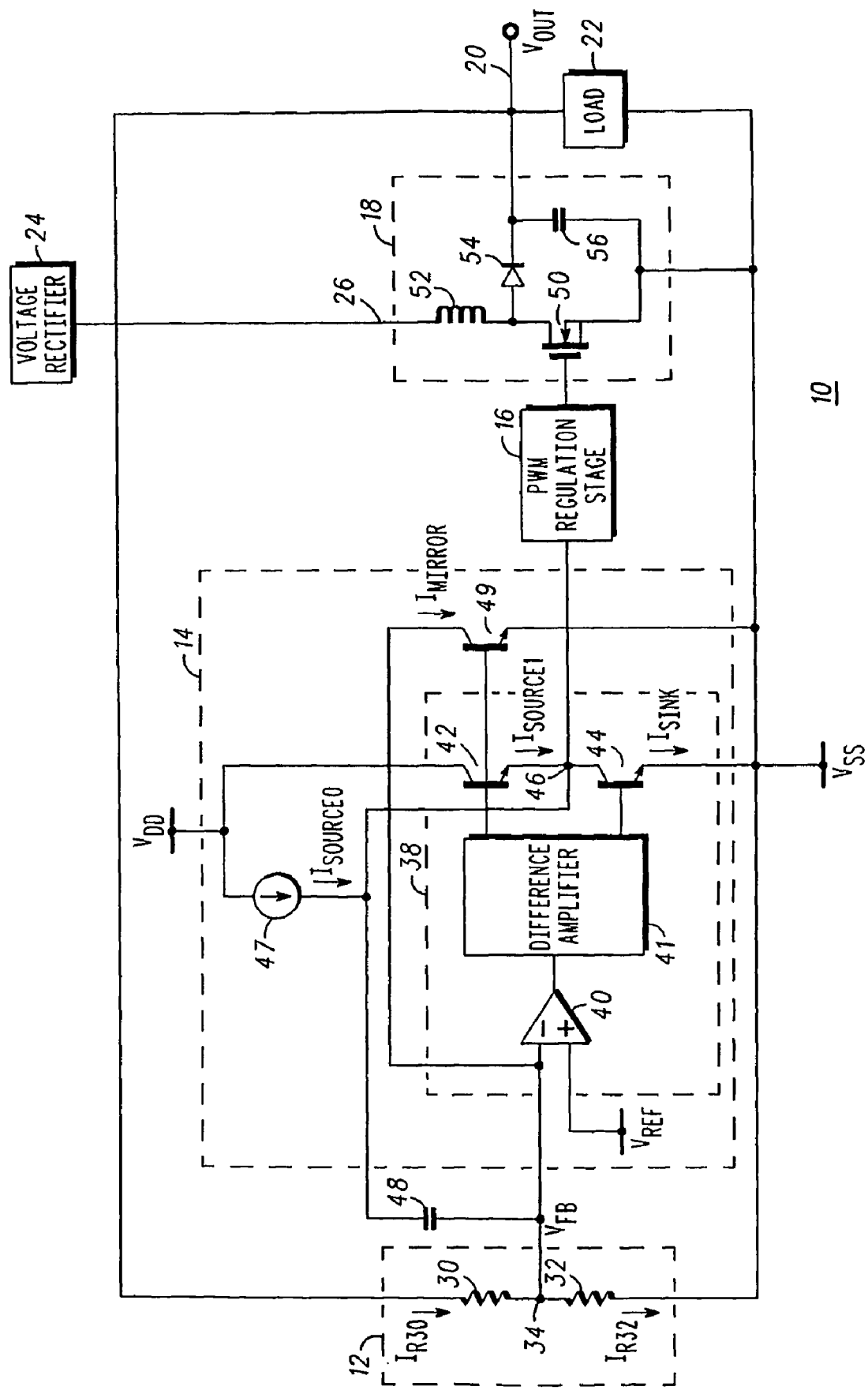

METHOD FOR REGULATING A VOLTAGE AND CIRCUIT THEREFOR

FIELD OF THE INVENTION

This invention relates, in general, to voltage regulation and, more particularly, to undervoltage protection of a regulated voltage.

BACKGROUND OF THE INVENTION

Voltage regulators that provide AC/DC rectification typically include a full wave voltage rectifier stage, such as, for example, a diode bridge, a main Switch Mode Power Supply ("SMPS") stage, and a Power Factor Correction ("PFC") stage inserted between the line and the main SMPS. The SMPS provides regulation of an output waveform and the PFC stage draws a sinusoidal current from the line and provides Direct Current ("DC") voltage to the main SMPS. For many systems to operate properly, it is desirable for the output voltage of the PFC stage to be within a specified range. PFC circuits deliver a squared sinusoidal power that matches an average power demand of the load. Thus, when the power fed to the load is lower than the demand, an output capacitor within the PFC stage compensates for the lack of energy by discharging and when the power fed to the load is greater than the demand, the capacitor stores the excess energy. As a consequence, a ripple appears in the output voltage that designers compensate for by integrating the output voltage. A drawback with the integration is that it degrades the dynamic performance of the power supplies and makes them slow. For example, an abrupt decrease in the load results in a high output voltage overshoot and an abrupt increase in the load results in a high output voltage undershoot.

Hence, a need exists for a voltage regulator and a method of improving the dynamic performance and speed of the voltage regulator. In addition, it is desirable for the voltage regulator to be cost and time efficient to manufacture.

BRIEF DESCRIPTION OF THE DRAWINGS

The present invention will be better understood from a reading of the following detailed description, taken in conjunction with the accompanying drawing figure in which the single FIGURE is a schematic diagram of a voltage regulator having an undervoltage protection circuit in accordance with an embodiment of the present invention.

DETAILED DESCRIPTION

The single FIGURE is a schematic diagram of a voltage regulator 10 comprising an undervoltage protection stage 14 having an input coupled to a feedback stage 12 and an output coupled to a Pulse Width Modulation ("PWM") regulation stage 16. An output of PWM regulation stage 16 is coupled to an input of a Power Factor Correction ("PFC") stage 18 and an output 20 of PFC stage 18 serves as an output of voltage regulator 10. An output voltage $V_{OUT}$ appears at output 20. A load 22 is coupled between output 20 and a source of operating potential such as, for example, $V_{SS}$. By way of example, source of operating potential $V_{SS}$ is set to ground. A voltage rectifier 24 is connected to an input 26 of voltage regulation stage 18.

Feedback stage 12, also referred to as a feedback network, is coupled to output 20 and may be comprised of, for example, a pair of resistors 30 and 32. One terminal of resistor 32 is coupled for receiving a source of operating potential such as, for example, $V_{SS}$, and the other terminal of resistor 32 is commonly connected to a terminal of resistor 30 at a node 34. The other terminal of resistor 30 is connected to output 20. The commonly connected terminals of resistors 30 and 32 that are connected at node 34 are also connected to an input of undervoltage protection stage 14. It should be understood that feedback stage 12 is not limited to being a resistor divider network. Although feedback stage 12 may be integrated in a semiconductor substrate along with undervoltage protection stage 14, PWM regulation stage 16, and PFC stage 18, it is preferably provided as an off-chip circuit network. Feedback stage 12 is also referred to as being a feedback network or a feedback section.

In accordance with one embodiment, undervoltage protection stage 14 comprises an error amplifier 38, a current source 47, and a mirror transistor 49. Error amplifier 38 comprises a differential input stage 40, a difference amplifier 41, a current source transistor 42, and a current sink transistor 44. Differential input stage 40 has an inverting input and a non-inverting input which serve as inputs of undervoltage protection circuit 14. An output of differential input stage 40 is connected to an input of difference amplifier 41. An output of difference amplifier 41 is connected to the base of transistor 42 and another output of difference amplifier 41 is connected to the base of transistor 44. Error amplifiers are known to those skilled in the art. The collector of transistor 42 is coupled for receiving a source of operating potential such as, for example, $V_{DD}$. By way of example, source of operating potential $V_{DD}$ is set to 5 volts. The emitter of transistor 42 is connected to the collector of transistor 44 at node 46 and the emitter of transistor 44 is coupled for receiving a source of operating potential such as, for example, $V_{SS}$. Node 46 serves as an output of undervoltage protection stage 14 and is connected to the input of PWM regulation stage 16. In addition, node 46 is coupled to the inverting input of differential input stage 40 through a charge storage device 48. By way of example, charge storage device 48 is a compensation capacitor. One terminal of a current source 47 is coupled for receiving a source of operating potential such as, for example, $V_{DD}$, and the other terminal is connected to node 46 and to a terminal of compensation capacitor 48. Current source 47 provides a current $I_{SOURCE0}$ to node 46. Undervoltage protection stage 14 further includes a mirror transistor 49 having a base connected to the base of current source transistor 42, a collector connected to the inverting input of differential input stage 40, and an emitter coupled for receiving a source of operating potential such as, for example $V_{SS}$. Although transistors 42, 44, and 49 are shown and described as bipolar transistors, it should be understood that this is not a limitation of the present invention. For example, they can be Field Effect Transistors ("FETs") having gates, sources, and drains. It should be further understood that the bases of bipolar transistors and the gates of FETs are also referred to as control electrodes and the emitters and collectors of bipolar transistors are also referred to as current carrying electrodes. Likewise, the drains and sources of FETs are also referred to as current carrying electrodes.

Circuit implementations for a voltage rectifier such as voltage rectifier 24 and a PWM regulation stage such as PWM regulation stage 16 are known to those skilled in the art.

PFC correction stage 18 comprises a FET 50 having a gate that serves as an input of PFC circuit 18, a drain coupled to voltage rectifier stage 24 through an inductor 52, and a source coupled for receiving a source of operating potential such as, for example, $V_{SS}$. The source of FET 50 is also connected to the substrate in which FET 50 is formed. The drain of FET 50 is connected to the anode of a diode 54 and the cathode of diode 54 is connected to one terminal of an output capacitor 56. The other terminal of output capacitor 56 is coupled for receiving a source of operating potential such as, for example, $V_{SS}$. Thus, a terminal of diode 54 and a terminal of output capacitor 56 are commonly connected to each other to form output 20. Preferably, load 22 is coupled in parallel with capacitor 56.

In operation, PFC stage 18 receives a rectified voltage signal from voltage rectifier 24, boosts the rectified voltage signal, and generates an output voltage $V_{OUT}$ at output 20. Output voltage $V_{OUT}$ is fed back to feedback network 12 which generates a current $I_{R30}$ that flows through resistor 30 and a current $I_{R32}$ that flows through resistor 32. The sum of voltage $V_{SS}$ and the voltage across resistor 32 created by current $I_{R32}$ equals the voltage at node 34, i.e., voltage $V_{FB}$ at node 34. Feedback signal $V_{FB}$ appears at the inverting input of differential input stage 40. During operation in the steady state operating mode or condition, i.e., steady state operation, voltage regulator 10 maintains the signal or voltage at the inverting input to be at a value substantially equal to the signal or voltage at the non-inverting input of error amplifier 38, i.e., voltage $V_{REF}$. Thus, the voltages at the inputs of differential input stage 40 substantially equal reference voltage $V_{REF}$. During this operating mode, differential input stage 40 generates an error signal that is used by difference amplifier 41 to generate a control signal for switching on or activating current sink transistor 44 and a control signal for switching off current source transistor 42. Switching on a transistor is also referred to as turning on the transistor and, switching off a transistor is also referred to as turning off the transistor. Thus, current sink transistor 44 sinks a current $I_{SINK}$ from node 46 and current source 47 sources a current $I_{SOURCE0}$ to node 46. Current $I_{SINK}$ is substantially equal to current $I_{SOURCE0}$. It should be noted that when current is sunk or transmitted away from a node it flows away from the node and when a current is sourced to or transmitted to a node it flows toward the node. It should be further noted that during steady state operation compensation capacitor 48 is neither actively charged nor actively discharged, but a nominal voltage is maintained thereacross.

In an operating mode or condition in which output voltage $V_{OUT}$ has a small undershoot, currents $I_{R30}$ and $I_{R32}$ which flow through resistors 30 and 32, respectively, are less than their nominal values. By way of example, a nominal output voltage $V_{OUT}$ is approximately 400 volts and a light or small undershoot is approximately 10 volts or less. In particular, current $I_{R32}$ flowing through resistor 32 will be too low to maintain node 34 at reference voltage level $V_{REF}$. In this case, transistor 44 reduces or decreases current $I_{SINK}$ such that the sum of currents $I_{SOURCE0}$ and $I_{SINK}$ at node 46 is no longer zero. It should be noted that current $I_{SINK}$ is reduced to a non-zero level. The difference between current $I_{SOURCE0}$ and reduced current $I_{SINK}$, i.e., a difference current, flows through compensation capacitor 48 and supplements current $I_{R32}$ flowing through resistor 32, thereby raising the voltage at the inverting input of error amplifier 38 so that it is substantially the same as reference voltage $V_{REF}$.

In an operating mode or condition in which output voltage $V_{OUT}$ has a large undershoot, i.e., output voltage $V_{OUT}$ is lower than a nominal value by more than about 30 volts, current source 47 is unable to maintain the voltage at the inverting input of differential input stage 40 at a value substantially equal to reference voltage $V_{REF}$. Differential input stage 40 generates an error signal that is amplified by difference amplifier 41, which in turn generates a control signal that switches off current sink transistor 44 and a control signal that switches on current source transistor 42. Thus, current sink transistor 44 sinks substantially zero current and current source transistor 42 and mirror transistor 49 generate currents $I_{SOURCE1}$ and $I_{MIRROR}$, respectively. A current substantially equal to the sum of the currents $I_{SOURCE1}$, and $I_{MIRROR}$ quickly charge compensation capacitor 48 and provide a current to node 34. Mirror transistor 49 sinks current $I_{MIRROR}$ from node 34 which is substantially equal to the current that is provided by source transistor 42. Because mirror transistor 49 sinks or removes a current from node 34 substantially equal to current $I_{SOURCE1}$ provided to node 34 by current source transistor 42, current $I_{SOURCE1}$ provided by current source transistor 42 does not flow through resistor 32 and does not help maintain the voltage at the inverting input of differential input stage 40 at a level equal to reference voltage $V_{REF}$. In other words, current $I_{SOURCE1}$ provided by current source transistor 42 is absorbed by mirror transistor 49.

Quickly charging compensation capacitor 48 results in a rapid increase in the voltage at node 46. This voltage is injected into PWM stage 16 to control the power delivered by PFC stage 18 to load 22. Thus, rapidly charging capacitor 48 leads to an increase in the power delivered to load 22 and hence to rapidly mitigate any undershoot that may appear in output voltage $V_{OUT}$.

By now it should be appreciated that a regulator circuit having an undervoltage protection stage and method for regulating output voltage have been provided. In steady state operation, output voltage $V_{OUT}$ is at its desired or nominal level and the current $I_{R30}$ that flows through resistor 30 is substantially the same as current $I_{R32}$ that flows through resistor 32 in response to reference voltage $V_{REF}$ appearing across resistor 32. Since reference voltage $V_{REF}$ is present on the inverting input of differential input stage 40, substantially no current flows through capacitor 48 and current $I_{SINK}$ cancels current $I_{SOURCE0}$ supplied by current source 47.

If output voltage $V_{OUT}$ decreases, current $IR_{30}$ also decreases. When voltage $V_{OUT}$ and current $IR_{30}$ decrease to a level that current $IR_{30}$ is not sufficient to maintain the voltage at node 34 to be substantially equal to reference voltage $V_{REF}$, current $I_{SINK}$ decreases so that a difference current equal to the difference between current $I_{SOURCE0}$ and $I_{SINK}$ provides additional current through resistor 32 to maintain node 34 at a voltage substantially equal to reference voltage $V_{REF}$. This current also charges capacitor 48 and increases the voltage at node 46, which increases the power delivered to load 22 by PFC stage 18 and thereby decreases the amount of undershoot appearing in output voltage $V_{OUT}$.

If the undershoot in output voltage $V_{OUT}$ is so severe that current $I_{SOURCE0}$ sourced by current source 47 is not large enough to maintain the voltage at node 34 substantially equal to reference voltage $V_{REF}$, current $I_{SINK}$ from current sink 44 decreases to zero and current source 42 provides additional current $I_{SOURCE}$. This condition occurs when the undershoot voltage is greater than a voltage equal to the product of current $I_{SOURCE0}$ and the resistance value of resistor 30. Current $I_{SOURCE1}$ is mirrored by mirror transistor 49 and extracted from node 34, thereby preventing it from maintaining the voltage at node 34 equal to reference voltage $V_{REF}$. Thus, the voltage at node 34 remains lower than reference voltage $V_{REF}$ and error amplifier 38 causes current source transistor 42 to source its maximum current to force the voltage appearing at node 34 to be equal to reference voltage $V_{REF}$. Mirror transistor 49 compensates for this action by absorbing a current substantially equal to current $I_{SOURCH1}$ produced by current source transistor 42. Because mirror transistor 49 absorbs current $I_{SOURCE1}$, this current charges compensation capacitor 48 without raising the voltage at node 34. An advantage of the present invention is that current $I_{SOURCE1}$ helps to charge compensation capacitor 48 at a very high speed, which increases the voltage at node 46 and helps to decrease the undershoot voltage present in output voltage $V_{OUT}$. Once the undershoot voltage is less than a voltage substantially equal to the product of current $I_{SOURCE0}$ and the resistance value of resistor 30, output voltage $V_{OUT}$ is no longer in the severe undershoot condition but may be in a light undershoot or a steady state condition.

Although certain preferred embodiments and methods have been disclosed herein, it will be apparent from the foregoing disclosure to those skilled in the art that variations and modifications of such embodiments and methods may be made without departing from the spirit and scope of the invention. For example, the circuit can be modified to overcome overshoot present in the output voltage. One technique for implementing these modifications is to replace current source 47 with a current sink, remove mirror transistor 49 and couple a mirror transistor to transistor 44. It is intended that the invention shall be limited only to the extent required by the appended claims and the rules and principles of applicable law.

What is claimed is:

1. The method for regulating a voltage comprising:
    comparing a first signal with a reference signal to create an error signal;
    generating first and second control signals in response to the error signal; and in a first operating mode:
        generating a first current in response to the first control signal, the first current flowing towards a first node;
        generating a second current in response to the first control signal, the second current flowing from the first node, wherein the second current substantially absorbs the first current from the first node and increases a voltage at a second node; and
        using the second control signal to switch off a transistor; and
    in a second operating mode:
        generating a difference current; and
        using the difference current to increase a level of the first signal so that it is substantially equal to the reference signal, and further including changing a third current to have an increased third current level in response to the first signal being greater than the reference signal and using the difference current to decrease the first signal to be substantially equal to the reference signal, wherein the difference current is substantially equal to a difference between a fourth current and the increased third current level.

2. The method of claim 1, wherein generating the first current in response to the first control signal includes activating a current source.

3. The method of claim 2, wherein generating the first and second currents includes generating the second current to be substantially equal to the first current.

4. The method of claim 1, further including decreasing a third current to have a reduced third current level in response to the first signal being less than the reference signal and using the difference current to increase the first signal to be substantially equal to the reference signal, wherein the difference current is substantially equal to a difference between a fourth current and the reduced third current level.

5. The method of claim 1, wherein a fourth current and the third current cooperate to charge a charge storage device.

6. A method for regulating a voltage, comprising:
    comparing a first signal with a reference signal to generate an error signal;
    generating first and second control signals in response to the error signal;
    using the first control signal to generate first and second currents;
    in a first operating condition wherein the output voltage has a first undershoot level:
        sourcing the first current to a first node to increase a voltage at a second node; and
        sinking the second current from the first node, wherein the second current substantially equals the first current;
    in a second operating condition wherein the output voltage has a second undershoot level, the amount of undershoot of the second undershoot level less than the amount of undershoot of the first undershoot level:
        using the second control signal to generate a third current;
        providing a fourth current, wherein the fourth current flows towards the second node and the third current flows from the second node; and
        sourcing a difference current to the first node, wherein the difference current substantially equals a difference between the fourth current and the third current;
    in a third operating condition wherein the output voltage is in a steady state:
        switching off the first and second currents;
        sourcing the fourth current to the second node; and
        sinking the third current from the second node.

7. The method of claim 6, wherein sourcing the difference current to the first node includes transmitting the difference current through a resistor.

8. The method of claim 6, wherein sourcing the difference current to the first node includes charging a capacitor.

9. The method of claim 6, wherein the fourth current is substantially equal to the third current in the third operating condition.

10. The method of claim 6, wherein the charge storage element is a capacitor.

11. The method of claim 10, wherein sourcing the first current to the first node includes charging a charge storage element.

12. The method of claim 6, wherein using the first control signal to generate the first and second currents includes switching on first and second transistors.

13. The method of claim 12, wherein generating the first and second control signals in response to the error signal includes switching off a second transistor.

14. The method of claim 6, wherein switching off the first and second currents includes switching off a first transistor, and wherein sinking the third current from the second node includes using a transistor to sink the third current.

15. A voltage regulator, comprising a voltage protection stage, wherein the voltage protection stage comprises:
    a differential input stage having a non-inverting input and an inverting input;
    a control circuit coupled to the differential input stage, the control circuit having first and second outputs;
    a first transistor having a control electrode and first and second current carrying electrodes, the control electrode coupled to the first output of the control circuit and the first current carrying electrode coupled for receiving a first source of operating potential;
    a second transistor having a control electrode and first and second current carrying electrodes, the control electrode of the second transistor coupled to the second output of the control circuit, the first current carrying electrode coupled to the second current carrying electrode of the first transistor to form a node, and the second current carrying electrode of the second transistor coupled for receiving a second source of operating potential; and a third transistor having a control electrode and first and second current carrying electrodes, the control electrode of the third transistor coupled to the control electrode of the first transistor, the first current carrying electrode of the third transistor coupled to the inverting input of the differential input stage, and the second current carrying electrode coupled for receiving the second source of operating potential.

16. The voltage regulator of claim 15, further including a current source coupled to the node.

17. The voltage regulator of claim 16, further including a capacitor coupled between the node and the inverting input of the differential input stage.

18. The voltage regulator of claim 17, further including:
a feedback stage coupled to the inverting input of the differential input stage;
a regulation stage coupled to the node; and
a power factor correction stage coupled to the regulation stage, wherein the power factor correction stage has an output coupled to the feedback stage.

19. The voltage regulator of claim 18, further including a voltage rectifier stage coupled to the power factor correction stage.

20. The method of claim 1 further including using the second current to charge a capacitor coupled to the first node.

21. The method of claim 1, wherein a fourth current and the third current cooperate to discharge a charge storage device.

22. A method for regulating a voltage comprising:
comparing a first signal with a reference signal to create an error signal;
generating first and second control signals in response to the error signal; and in a first operating mode:
generating a first current in response to the first control signal, the first current flowing towards a first node;
generating a second current in response to the first control signal, the second current flowing from the first node, wherein the second current substantially absorbs the first current from the first node and increases a voltage at a second node; and
using the second control signal to switch off a transistor; and
in a second operating mode:
generating a difference current; and
using the difference current to increase a level of the first signal so that it
is substantially equal to the reference signal, and further including in a third operating mode generating another difference current and using the another difference current to decrease a level of the first signal so that it is substantially equal to the reference signal.

23. The method of claim 6, further including in a fourth operating condition wherein the output voltage has an overshoot:
sinking a fifth current from the first node; and
sinking the first current from the second node to discharge a capacitor.

24. The method of claim 6, wherein, in the second operating condition, decreasing the third current to a reduced level that is a non-zero level and wherein the difference current substantially equals a difference between the fourth current and the third current that is at the reduced level.

25. The method of claim 22, wherein generating the first current in response to the first control signal includes activating a current source.

26. The method of claim 25, wherein generating the first and second currents includes generating the second current to be substantially equal to the first current.

27. The method of claim 22, further including decreasing a third current to have a reduced third current level in response to the first signal being less than the reference signal and using the difference current to increase the first signal to be substantially equal to the reference signal, wherein the difference current is substantially equal to a difference between a fourth current and the reduced third current level.

28. The method of claim 22, further including using the second current to charge a capacitor coupled to the first node.

* * * * *